United States Patent
Stroebele et al.

(10) Patent No.: US 6,639,774 B1
(45) Date of Patent: Oct. 28, 2003

(54) DAMPING CIRCUIT FOR A TWO-WIRE BUS SYSTEM

(75) Inventors: Hans-Peter Stroebele, Stuttgart (DE); Wolfgang Meissner, Vaihingen (DE); Uwe Guenther, Nufringen (DE); Bernd Hilgenberg, Reutlingen (DE); Juergen Reinhardt, Hielbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,784
(22) PCT Filed: Jun. 2, 1999
(86) PCT No.: PCT/DE99/01629
§ 371 (c)(1), (2), (4) Date: Nov. 20, 2000
(87) PCT Pub. No.: WO00/35149
PCT Pub. Date: Jun. 15, 2000

(30) Foreign Application Priority Data

Dec. 7, 1998 (DE) .......................... 198 56 283

(51) Int. Cl.$^7$ .................................................. H02H 3/18
(52) U.S. Cl. .......................... 361/86; 361/56; 370/438; 375/7; 375/257
(58) Field of Search .................. 361/86, 56; 375/7, 375/257; 370/438

(56) References Cited

U.S. PATENT DOCUMENTS

| 4,005,342 A | * | 1/1977 | Davis ........................... 361/56 |
| 4,479,228 A | | 10/1984 | Crane |
| 4,903,280 A | * | 2/1990 | Lang et al. .................. 375/220 |
| 5,617,282 A | * | 4/1997 | Rall et al. ..................... 361/56 |
| 5,734,658 A | * | 3/1998 | Rall et al. ................... 370/438 |

FOREIGN PATENT DOCUMENTS

| DE | 42 35 616 | 4/1993 |
| EP | 0 235 648 | 9/1987 |

\* cited by examiner

Primary Examiner—Gregory J. Toatley, Jr.
Assistant Examiner—James A Demakis
(74) Attorney, Agent, or Firm—Kenyon & Kenyon

(57) ABSTRACT

A two-wire bus system for connecting a plurality of users has at least one damping circuit for damping line resonances in the two-wire bus system with respect to a reference potential. The damping characteristic of the damping circuit is selected such that the damping only becomes operative above a preestablished reference voltage threshold$_1$ value. In this manner, it is achieved that a useful signal is not weakened by the damping circuit, but rather resonance voltages are damped only above the threshold value. It is advantageous if each of the users of the bus system has assigned to it a damping circuit.

9 Claims, 2 Drawing Sheets

DAMPING CIRCUIT FOR A TWO-WIRE BUS SYSTEM

FIELD OF THE INVENTION

The present invention relates to a two-wire bus system for connecting a plurality of users to at least one damping circuit for damping line resonances in the two-wire bus system with respect to a reference potential.

BACKGROUND INFORMATION

For transmitting information among different users in a motor vehicle, two-wire bus systems or so-called Controller-Area-Networks (CAN) are known. The hardware of a two-wire bus system of this type designed for high information-transmission speeds is composed of a two-wire bus line to which a plurality of users (transmitters/receivers) are connected. The two bus lines are typically both terminated at 120Ω. The function of the two-wire bus system lies in the fact that information signals among the users are transmitted as a voltage difference between the two bus lines, thus achieving greater signal reliability and less susceptibility to interference. In the state of rest, both bus lines (C_H, C_L), for example, are at a potential of 2.5 V. If a signal representing the logical "1" is sent over the two-wire bus line, then the potential of first bus line C_H is raised, for example, to 3.5 V, whereas the potential on bus line C_L is lowered to 1.5 V. This voltage difference is then detected at an input stage of a user.

If high-frequency radiation should arise, for example, as a result of a mobile radio or the like, resonance voltages, with respect to zero potential, can arise in the bus line or in portions thereof in the metal body of the motor vehicle. It is true that resonance voltages of this type regularly occur in both bus lines of the two-wire bus system without thereby significantly impairing the useful signal, which is the differential signal between the two bus lines. However, the resonance voltages can be so high that the input stage of a user is overloaded and therefore a reliable signal transmission is no longer possible. Furthermore, as a result of asymmetries in the bus system, resonance voltage interference can also negatively influence the useful signal as well.

One possibility for damping resonance voltages of this type in a two-wire bus system is a common-mode termination of the two ends of the bus system (see FIG. 1, resistor 12, 13, capacitor 14), in which the ends of the two bus lines are connected to each other via two serially connected resistors, for example, of 60Ω, and the connecting point of the serial resistors, which is arranged symmetrically with respect to the two bus lines, is connected to ground by a capacitor (optionally connected in series to a further resistor). In this manner, high-frequency resonance voltages are removed (diverted) to ground, the 120Ω-termination of the ends of the two bus lines being maintained. A common-mode termination of this type, however, is only possible at the two ends of the two bus lines. A common-mode termination within the bus line or in a branched line of same would lead to undesirable reflection effects in the bus line.

A further possibility to protect the receiver from overload from high-frequency resonance voltages lies in inserting a common-mode choke (choking code) between the two bus line inputs of a user. At both inputs of the user (to bus line C_H and to bus line C_L), a coil is attached, which is coupled to the other coil so that the resonance voltages cancel each other out. However, to provide a common-mode choke for each user is cumbersome and expensive. In addition, the upstream inductances, in connection with the capacitances in the user circuit, can lead to undesirable oscillations.

ADVANTAGES OF THE INVENTION

In a two-wire bus system according to the present invention the damping characteristic curve of the damping circuit is selected such that the damping only becomes operative above a preestablished resonance voltage threshold value. In this manner, a weakening of the useful signal is avoided. However, resonance voltages that lie above the threshold value and that could bring about an overload of the user input stages are damped.

The damping circuit is advantageously composed of a series circuit of a resistor having a voltage-limiting element and is connected, as a series circuit, between each of the two bus lines of the two-wire bus system and the reference potential. The voltage-limiting elements can be adjusted so that voltages in the range of the useful signals remain undamped, but voltage peaks above a voltage threshold value are diverted off via the resistor to ground.

The voltage-limiting elements are preferably configured so that the positive as well as negative half wave of a resonance oscillation is damped symmetrically with regard to a normal voltage potential (preferably 2.5 V) applied on each of the bus lines. In this manner, it is assured that an overload of user input stages is prevented both by positive as well as by negative half waves from resonance voltages. The voltage limit of the voltage-limiting elements, in this context, preferably lies 3 V above and below the normal voltage level of the two-wire bus system.

The voltage-limiting elements, for example, have Zener diodes for limiting the voltage.

It is advantageous if the reference potential is ground. The two-wire bus system according to the present invention can be designed, for example, for transmitting information in a motor vehicle.

According to one advantageous refinement of the present invention, each user connected to the two-wire bus system has assigned to it a damping circuit. In this manner, resonance voltages arising locally, for example, at dead-end segments of the bus line can be reliably damped. Since useful signals are not weakened, a multiplicity of damping circuits does not signify a worsening of the signal transmission in the two-wire bus system. It is advantageous if the damping circuit assigned to a user represents one component of an integrated circuit, which minimizes manufacturing costs.

DETAILED DESCRIPTION

Figure 1:
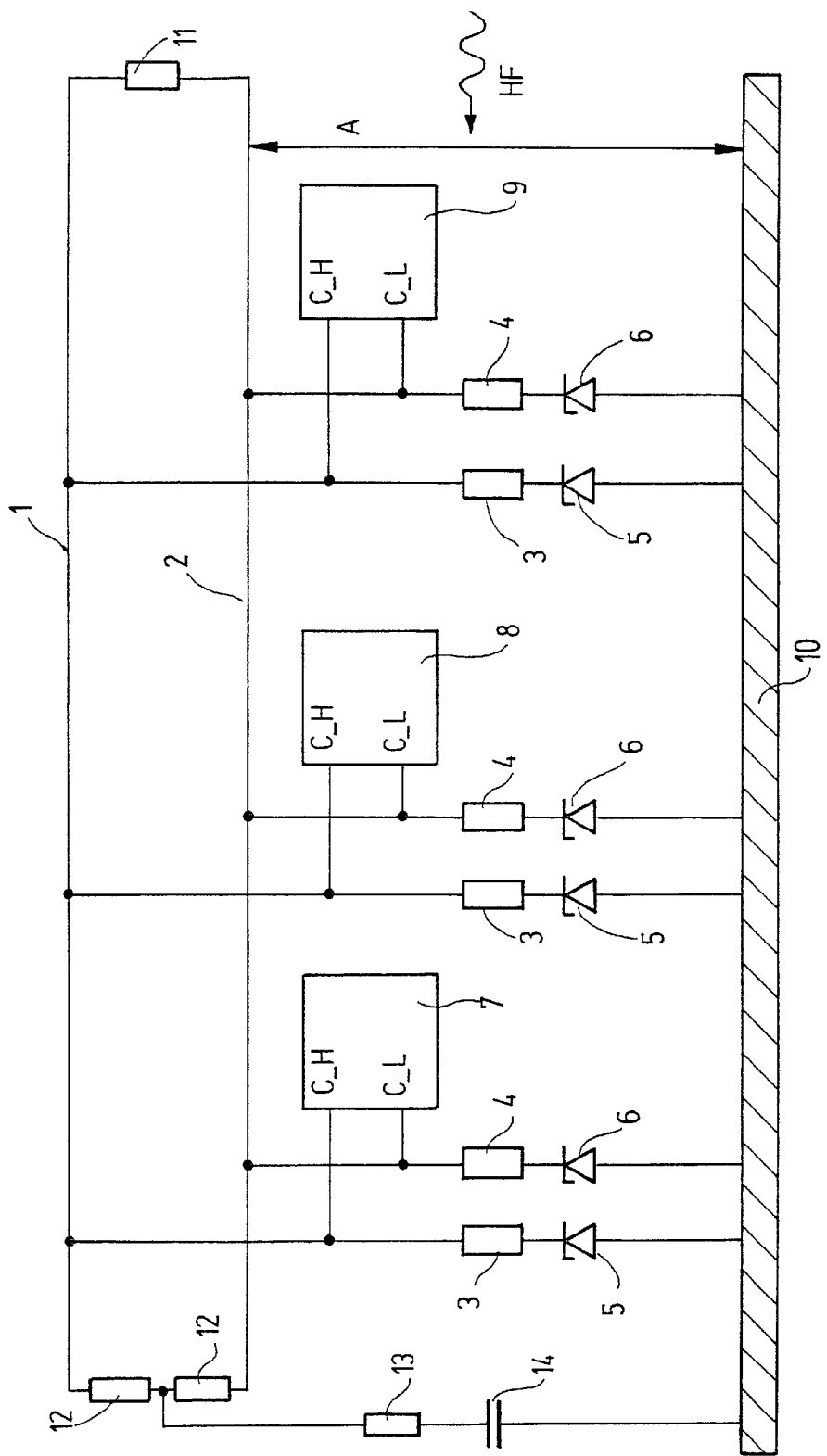
FIG. 1 depicts a circuit diagram of the two-wire system according to the present invention.

FIG. 1 depicts a bus system according to the present invention having a two-wire bus line 1, 2, which is terminated at its end by terminating resistors 11, 12 of, for example, 120 Ohms. Connected at two-wire bus line 1, 2 are users 7, 8, 9, among which information is transmitted. Each user can function both as a transmitter and a receiver. Any number of users can be connected to the bus system. Furthermore, the bus system is not limited to a purely linear configuration, but branches and the like can also be provided. An (undepicted) bus controller can be provided for controlling the bus system. The bus system advantageously functions to transmit information in a motor vehicle. In this context, information is transmitted as a differential signal between two bus lines C_H and C_L. The normal voltage level of both bus lines 1, 2 can be, for example, 2.5 V. If, as a signal, a logical "1" is to be transmitted, then the voltage at the respective transmitting user at terminal C_H is raised to 3.5 V and, in a symmetrical manner, the voltage at other terminal C_L is lowered to 1.5 V.

For damping line resonances generated by high-frequency radiation, depicted here schematically by A, each user 7, 8, 9 has assigned to it a damping circuit 3, 4, 5, 6. The latter is composed, in each case, of a series circuit of a resistor 3, 4 having a voltage-limiting element 5, 6, the series circuit being connected between each of two inputs C_H and C_L of a user and ground 10. Voltage-limiting element 5, 6 is configured such that the connection to ground is only disconnected above or below a preestablished voltage threshold value. In this case, the resonance voltage that arises can drain off to the ground via resistor 3, 4. Voltages lying within the range defined by the upper and lower limiting values are thus not damped. In this manner, the usual signal voltages used in the operation of the two-wire bus system are not damped. Also therefore, a large number of damping circuits does not impair the signal quality.

Figure 2:
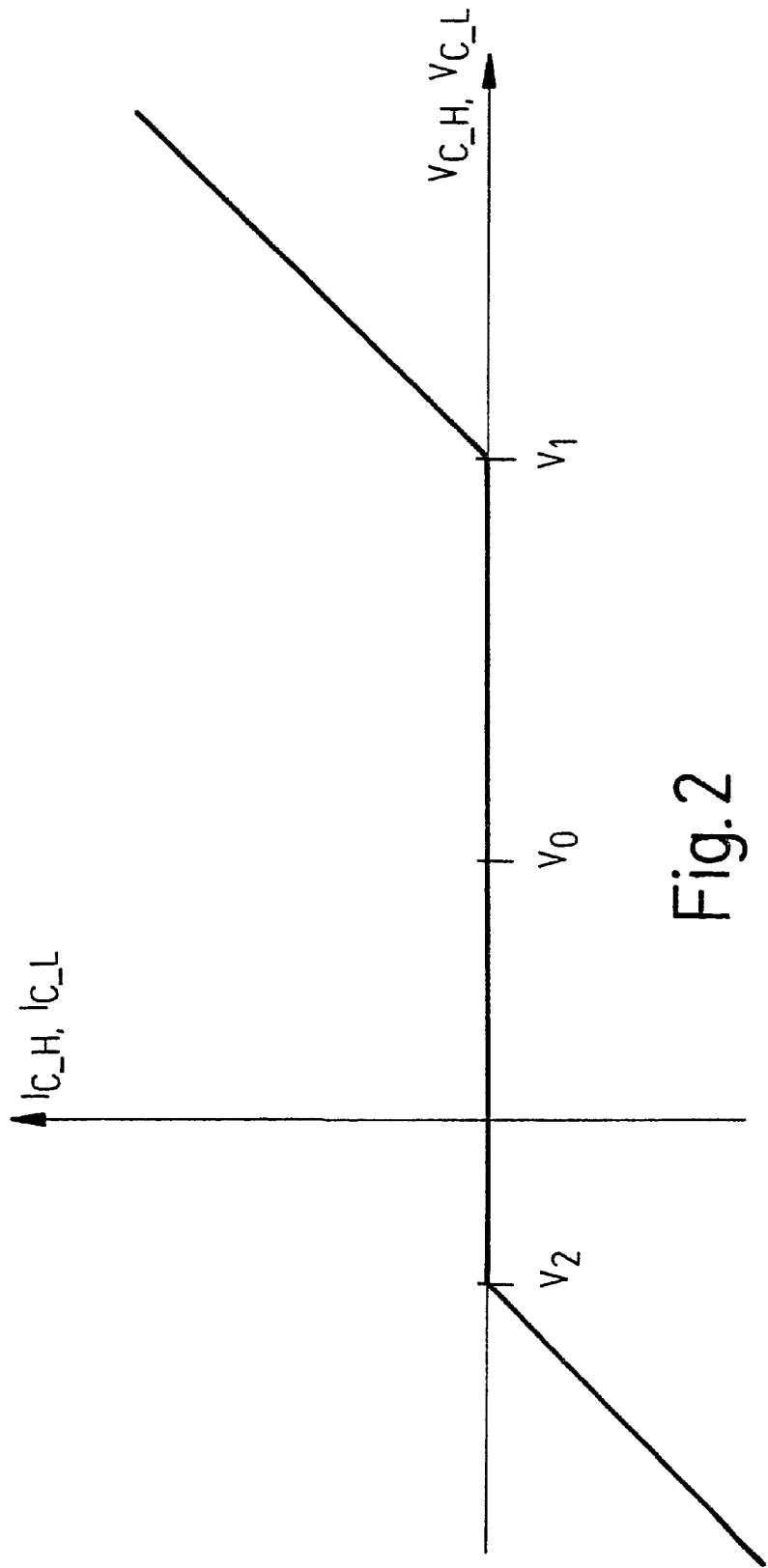
FIG. 2 is a schematic representation of a current-voltage characteristic curve of the two-wire bus system according to the present invention.

It is advantageous if voltage-limiting element 5, 6 is configured, in each case, so that the positive and negative half wave of a resonance oscillation is damped symmetrically with regard to a normal voltage level applied on the bus line. This mode of functioning is schematically illustrated in FIG. 2. Let the normal voltage level be $V_0$ (for example, 2.5 V). The respective voltage-limiting element is selected so that voltages within the range between $V_1$ and $V_2$ are not damped, whereas voltages above $V_1$ and voltages below $V_2$ are damped by a current flow with respect to ground. The rise of these segments of the current-voltage characteristic curve in FIG. 2 is determined by the specific resistor 3, 4. Voltage limits $V_1$ and $V_2$ are advantageously selected such that the signal voltages of the two-wire bus system lie within the horizontal characteristic curve range between voltage values $V_1$ and $V_2$, but an overload of the user input stages would only clearly arise above $V_1$ or below $V_2$. It is advantageous if a damping circuit of this type is provided in the vicinity of each user of the two-wire bus system. On the basis of the damping characteristic described, the damping circuit only becomes active in response to those users in which a large resonance voltage also arises. As a result, the useful signal is only weakened at a few users, so that reliable signal transmission is also possible.

In the two-wire bus system illustrated in FIG. 1, at the left end of two-wire bus line 1, 2, a common-mode termination composed of two terminal resistors 12 having the same resistance value is additionally provided, the resistors being connected to ground at the connecting point by a further resistor 13 and a capacitor 14. A common-mode termination of this type, however, as was discussed above, can only be connected to the ends of the two-wire bus line.

What is claimed is:

1. A two-wire bus system comprising:
   at least one damping circuit for connecting to a plurality of users for damping line resonances in the two-wire bus system with respect to a reference potential, the at least one damping circuit having a preselected damping characteristic such that the damping becomes operative only above a resonance voltage threshold value.

2. The two-wire bus system according to claim 1, wherein each of the at least one damping circuit includes a series circuit of a resistor having a voltage-limiting element, and further comprising two bus lines, the at least one damping circuit being connected between each of the two bus lines and the reference potential.

3. The two-wire bus system according to claim 1, wherein the at least one damping circuit includes two voltage-limiting elements damping a positive and a negative half wave of a resonance oscillation symmetrically with respect to a normal voltage level applied on a respective bus line.

4. The two-wire bus system according to claim 2, wherein the voltage-limiting element includes a Zener diode.

5. The two-wire bus system according to claim 3, wherein the voltage-limiting elements have a voltage limit which is about 3 V above the normal voltage level in the case of the positive half wave and about 3 V below the normal voltage level in the case of the negative half wave.

6. The two-wire bus system according to claim 1, wherein the reference potential is ground.

7. The two-wire bus system according to claim 1, wherein the two-wire bus system transmits information in a motor vehicle.

8. The two-wire bus system according to claim 1, wherein the at least one damping circuit includes a plurality of damping circuits, each of the damping circuits being assigned to a respective one of the users connected to the bus system.

9. The two-wire bus system according to claim 1, wherein the at least one damping circuit is a component of an integrated circuit.

* * * * *